(12) United States Patent
Jeong et al.

(10) Patent No.: US 11,197,175 B2
(45) Date of Patent: Dec. 7, 2021

(54) FORCASTING TIME SERIES DATA

(71) Applicant: Telefonaktiebolaget LM Ericsson (publ), Stockholm (SE)

(72) Inventors: Jaeseong Jeong, Solna (SE); Johan Haraldson, Stockholm (SE); Tor Kvernvik, Täby (SE); Yu Wang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 217 days.

(21) Appl. No.: 16/464,604

(22) PCT Filed: Nov. 28, 2017

(86) PCT No.: PCT/SE2017/051182
§ 371 (c)(1),
(2) Date: May 28, 2019

(87) PCT Pub. No.: WO2018/101878
PCT Pub. Date: Jun. 7, 2018

(65) Prior Publication Data
US 2021/0099894 A1    Apr. 1, 2021

Related U.S. Application Data

(60) Provisional application No. 62/427,256, filed on Nov. 29, 2016.

(51) Int. Cl.
*H04L 12/26* (2006.01)
*H04W 24/02* (2009.01)
(Continued)

(52) U.S. Cl.
CPC .......... *H04W 24/02* (2013.01); *H04W 16/18* (2013.01); *H04W 24/10* (2013.01); *H04W 84/18* (2013.01)

(58) Field of Classification Search
CPC ..... H04W 24/02; H04W 16/18; H04W 24/10; H04W 84/18
See application file for complete search history.

(56) References Cited

U.S. PATENT DOCUMENTS

2013/0143561 A1    6/2013    Nuss et al.
2014/0355484 A1   12/2014   Foster et al.
(Continued)

OTHER PUBLICATIONS

Extended European Search Report dated Oct. 9, 2019 issued for European Patent Application No. 17875313.3, 7 pages.
(Continued)

*Primary Examiner* — Siren Wei
(74) *Attorney, Agent, or Firm* — Rothwell, Figg, Ernst & Manbeck, P.C.

(57) ABSTRACT

A method for enabling forecasting of key performance indicators, KPIs, in a communication network is presented. The method is performed by a network node and comprises collecting (S100) time series data of KPIs in the communication network, extracting (S110) k-principal components of the collected time series data, determining (S120) a principal component score, PCS, from the collected time series data and the extracted k-principal components, and building (S130) a PCS forecast model from the determined PCS and period of time-attributes. Network nodes and computer program products thereof are also presented.

13 Claims, 8 Drawing Sheets

(51) Int. Cl.
*H04W 16/18* (2009.01)
*H04W 24/10* (2009.01)
*H04W 84/18* (2009.01)

(56) References Cited

U.S. PATENT DOCUMENTS

2015/0289149 A1* 10/2015 Ouyang ................ H04W 16/18
370/252
2016/0104076 A1* 4/2016 Maheshwari .......... G06N 20/00
706/12
2016/0285700 A1 9/2016 Gopalakrishnan et al.

OTHER PUBLICATIONS

International Search Report and Written Opinion issued in International Application No. PCT/SE2017/051182, dated Nov. 28, 2017 (13 pages).
Huang et al., "In-Network PCA and Anomaly Detection," NIPS'06 Proceedings of the 19th International Conference on Neural Information Processing Systems, pp. 617-624, Canada—Dec. 4-7, 2006 (9 pages).

* cited by examiner

FORCASTING TIME SERIES DATA

CROSS REFERENCE TO RELATED APPLICATION(S)

This application is a 35 U.S.C. § 371 National Stage of International Patent Application No. PCT/SE2017/051182, filed Nov. 28, 2017, designating the United States and claiming priority to U.S. provisional application No. 62/427,256, filed on Nov. 29, 2016. The above identified applications are incorporated by reference.

TECHNICAL FIELD

The present application relates to a method for enabling forecasting of time series data in a communication network, as well as a network node, a computer program and a computer program product therefor.

BACKGROUND

Key performance indicator (KPI) forecast plays a key role in ensuring a stable network maintenance of a communication network, by taking a proactive action on the forecasted KPI. This is of importance e.g. for engineers working at Network Operating Centers to maintain the network and to fix network problems. For example, they can automatically detect an anomaly event by comparing observed KPI values and forecasted KPI values.

The pattern of several KPIs, such as the number of triggers, usually have a stationary property, i.e. statistical property does not change when shifted in time. In case of stationary properties, a forecast is typically based on a Autoregressive Moving Average (ARMA) model that expresses the pattern by taking a moving average. On the other hand, if the pattern of KPI has seasonality or a non-stationary property, the forecast should adaptively learn them, which is rather challenging. Examples of KPIs having seasonality are the number of users and network traffic load.

There exist several works to find seasonality or non-stationary patterns, such as seasonal decomposition technique, Autoregressive Integrated Moving Average (ARIMA) model, Seasonal and Trend decomposition using Loess (STL) time series model. They all first extract the underlying patterns from training data, and after that, they forecast a KPI value.

SUMMARY

An object of embodiments presented herein is how to enable forecast of seasonal or non-stable key performance indicators (KPIs) in a communication network.

According to a first aspect there is presented a method for enabling forecasting of KPIs in a communication network. The method is performed by a network node and comprises collecting time series data of KPIs in the communication network, extracting k-principal components of the collected time series data, determining a principal component score (PCS) from the collected time series data and the extracted k-principal components, and building a PCS forecast model from the determined PCS and period of time-attributes.

The communication network may be a cellular communication network.

The collecting may comprise collecting time series data for a region, the region including a plurality of cells, a geographical region of a cellular communication network or a radio network controller (RNC) level.

The collecting may comprise collecting time series data over a period of time, the period of time including daily, weekly or monthly.

The method may comprise forming the period of time-attributes into a feature vector for building the PCS forecast model.

The time series data may include KPI data.

The extracting may comprise forming a KPI matrix with a KPI value for number of training period of times, number of regions, and sample rate, and extracting singular k-vector thereof.

A KPI matrix may be formed with rows, each of which forms a KPI value of sampled time within the period of time, and the number of rows is equal to the number of training period of times multiplied by the number of regions, and the extracting may extract the top k right singular vectors of the KPI matrix.

The period of time-attributes may include one or more of day of week, weather, temperature, and scheduled event.

The extracting may comprise running a principal component analysis (PCA).

The PCS forecast model may have a smaller dimension than that of the collected time series data.

The method may be for enabling forecasting of KPIs for network traffic.

According to a second aspect, there is presented a method for forecasting KPIs in a communication network. The method is performed by a network node and comprises forecasting a PCS from a PCS forecast model, wherein the PCS forecast model has been built by collected time series data of KPIs in the communication network and k-principal components extracted from the collected time series data, and forecasting time series data of KPIs from the k-principle components and the forecasted PCS.

The method may comprise feeding future period of time-attributes into the PCS forecast model. The future period of time-attributes may include one or more of day of week, forecasted weather, forecasted temperature, and scheduled event.

The forecasting a PCS may be performed by an autoregressive integrated moving average (ARIMA) model.

The method may be for forecasting of KPIs for network traffic.

According to a third aspect, there is presented a network node for enabling forecasting of KPIs in a communication network. The network node comprises a processor and a computer program product. The computer program product stores instructions that, when executed by the processor, causes the network node to collect time series data of KPIs in the communication network, extract k-principal components of the collected time series data, determine a PCS from the collected time series data and the extracted k-principal components, and to build a PCS forecast model from the determined PCS and period of time-attributes.

The collect may comprise collect time series data for a region, the region including a plurality of cells, a geographical region of a cellular communication network or an RNC level.

The collect may comprise collect time series data over a period of time, the period of time including daily, weekly or monthly.

The network node may be caused to form the period of time-attributes into a feature vector for building the PCS forecast model.

The time series data may include KPI data.

The extract may comprise form a KPI matrix with a KPI value for number of training period of times, number of regions, and sample rate, and extracting singular k-vector thereof.

A KPI matrix may be formed with rows, each of which forms a KPI value of sampled time within the period of time, and the number of rows is equal to the number of training period of times multiplied by the number of regions, and the extract may extract the top k right singular vectors of the KPI matrix.

The period of time-attributes may include one or more of day of week, weather, temperature, and scheduled event.

The extract may comprise running a PCA.

The PCS forecast model may have a smaller dimension than that of the collected time series data.

The network node may be for enabling forecasting of KPIs for network traffic.

According to a fourth aspect, there is presented a network node for forecasting KPIs in a communication network. The network node comprises a processor and a computer program product. The computer program product stores instructions that, when executed by the processor, causes the network node to forecast a PCS from a PCS forecast model, wherein the PCS forecast model has been built by collected time series data of KPIs in the communication network and k-principal components extracted from the collected time series data, and to forecast time series data of KPIs from the k-principle components and the forecasted PCS.

The network node may be caused to feed future period of time-attributes into the PCS forecast model. The future period of time-attributes may include one or more of day of week, forecasted weather, forecasted temperature, and scheduled event.

The forecast of a PCS may be performed by an ARIMA model.

The network node may be for forecasting of KPIs for network traffic.

According to a fifth aspect, there is presented a network node for enabling forecasting of KPIs in a communication network. The network node comprises a determination manager and a forecasting manager. The determination manager is for collecting time series data of KPIs in the communication network, extracting k-principal components of the collected time series data, and determining a PCS from the collected time series data and the extracted k-principal components. The forecasting manager is for building a PCS forecast model from the determined PCS and period of time-attributes.

According to a sixth aspect, there is presented a network node for forecasting KPIs in a communication network. The network node comprises a forecasting manager for forecasting a PCS from a PCS forecast model, wherein the PCS forecast model has been built by collected time series data of KPIs in the communication network and k-principal components extracted from the collected time series data, and for forecasting time series data of KPIs from the k-principle components and the forecasted PCS.

According to a seventh aspect, there is presented a computer program for enabling forecasting of KPIs in a communication network. The computer program comprises computer program code which, when run on a network node, causes the network node to collect time series data of KPIs in the communication network, extract k-principal components of the collected time series data, determine a PCS from the collected time series data and the extracted k-principal components, and to build a PCS forecast model from the determined PCS and period of time-attributes.

According to an eighth aspect, there is presented a computer program for forecasting KPIs in a communication network. The computer program comprising computer program code which, when run on a network node, causes the network node to forecast a PCS from a PCS forecast model, wherein the PCS forecast model has been built by collected time series data of KPIs in the communication network and k-principal components extracted from the collected time series data, and to forecast time series data of KPIs from the k-principle components and the forecasted PCS.

Forecasting KPI may be aggregated per region (e.g. cell, link, a geographical region, and RNC level).

According to a ninth aspect there is presented a computer program product comprising a computer program and a computer readable storage means on which the computer program is stored.

Generally, all terms presented herein are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The example embodiments are now described with reference to the accompanying drawings, in which.

DETAILED DESCRIPTION

Figure 1:
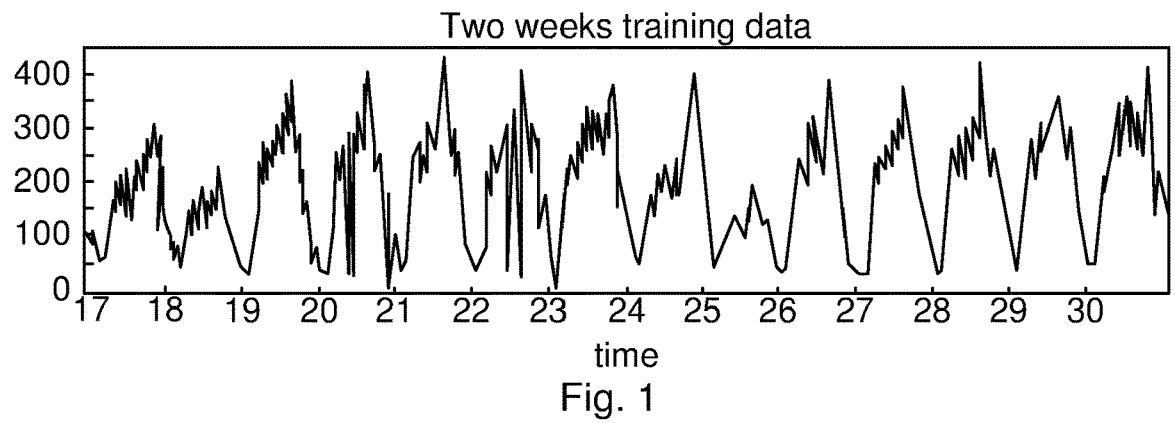
FIG. 1 is a schematic diagram illustrating training time-series data of a number of users of a cell.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment. Like numbers refer to like elements throughout the description.

There have been extensive works of principal component analysis (PCA) in many areas such as image processing and recommendation. For the case of network engineering, there have been several works for anomaly detection that aims at extracting the noise from time-series data, such as Huang, Ling, et al. "In-network PCA and anomaly detection", Advances in Neural Information Processing Systems, 2006. However, this work is only able to find anomalies that have already occurred in the past, rather than forecasting future traffic.

One of the most popular existing solutions for forecasting is based on seasonal decomposition techniques. As many key performance indicator (KPI) time-series show a seasonal pattern, a forecast based on learning those seasonal patterns is a promising way of doing the forecast. However, below we itemize several limitations on seasonal decomposition techniques (such as used in Autoregressive Integrated Moving Average (ARIMA) model):

It requires a manual tuning to handle seasonality. Cell-level KPI time-series have diverse seasonal patterns (e.g. weekday and weekend patterns are different, and even weekly time-series are sometimes different from each other), and existing methods are not adaptive enough.

More complex seasonality cannot easily be captured, such as e.g. a football game occurring at a stadium regularly but at different times and with different intensity.

A forecast cannot capture external effect such as temperature, maintenance schedule, and critical event.

If a training time-series is not sufficient, a forecast could include overfitting effects.

Embodiments presented herein aims at forecasting a period of time, e.g. one-day, single KPI time-series correctly. This forecast problem becomes rather challenging as time-series KPI data is generated from a smaller level of aggregation (e.g. cell-level or small region) of KPI and higher time resolution (e.g. 5 minutes). This is because 1) as the KPI values are aggregated in a smaller level of aggregation (e.g. aggregation of the KPI values collected within a certain cell), the noise and overfitting laid in the observed KPI values are not sufficiently suppressed, and 2) there exist several regions or cells whose time-series KPI data do not follow a regular seasonal pattern but is affected by external events or the environment.

Addressing those challenges and solving the problems is presented by splitting the forecasting into a training phase and a forecast phase. The training phase is composed of three steps: 1) k-principal component extraction, 2) determine the principal component score (PCS) for each day and cell (or region), 3) train a score-forecast model that matches day-profiles (e.g. day of the week, weather, and event) and collected scores in training days. The forecast phase is to forecast the time-series of the future days whose daily-attribute is known in advance, using the k-principle components and a score-forecast model trained during the training phase.

We first show one exemplary comparison between an embodiment presented herein and existing solutions, and after that the advantage of each step as presented herein, with reference to FIGS. 1-4.

Figure 2:
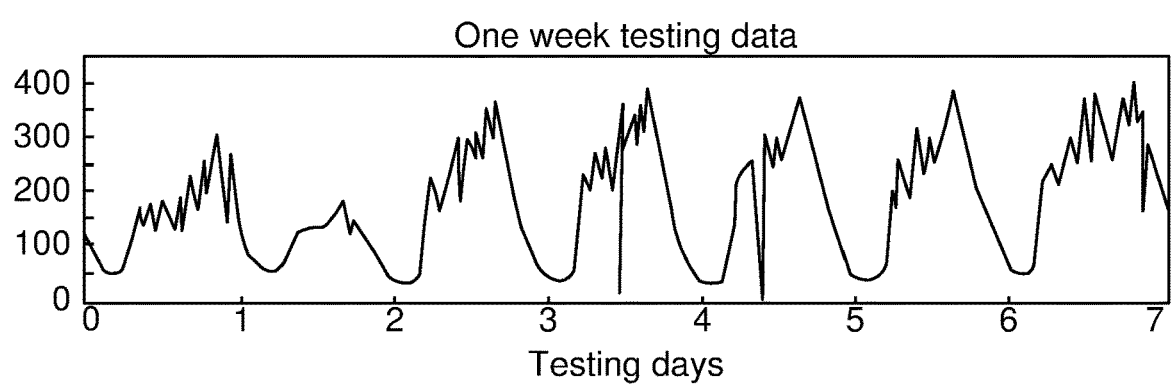
FIG. 2 is a schematic diagram illustrating a time-series data of a forecasted week (ground-truth result)
Figure 3:
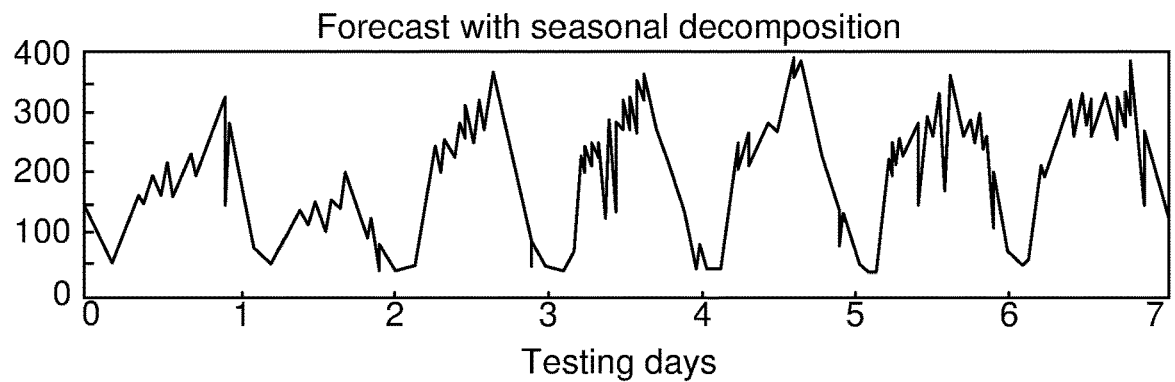
FIG. 3 is a schematic diagram illustrating forecast of one-week time-series by seasonal decomposition technique.
Figure 4:
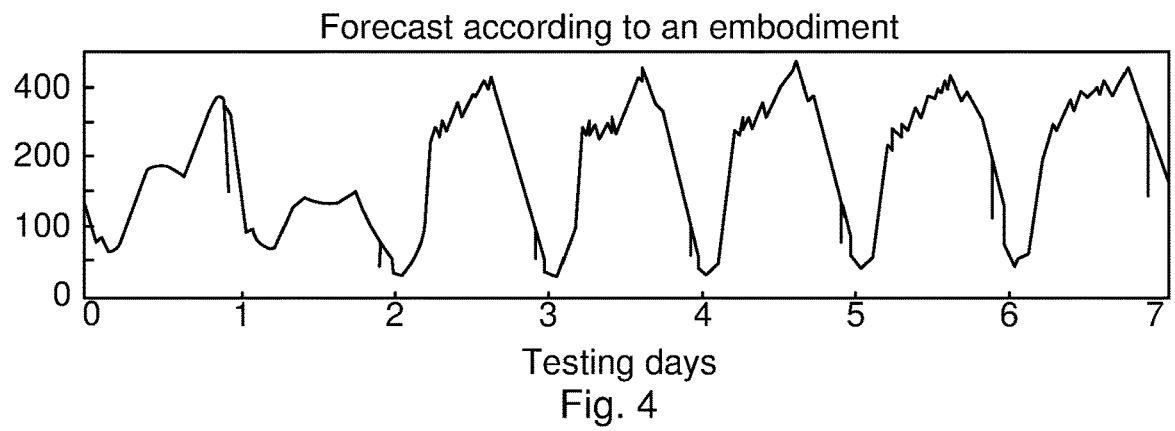
FIG. 4 is a schematic diagram illustrating forecast of one-week time-series according to an embodiment presented herein.

In the example test the training data is a two-week time-series of number of users within a certain cell of a cellular communication network, as illustrated in FIG. 1. The tested algorithms forecast one-week time-series of the KPI, as illustrated in FIG. 2. The mean squared error of the forecast as presented in FIG. 4 is 772, which is lower than that of seasonal decomposition that is 884, as illustrated in FIG. 3. The main reasons for this more accurate forecast illustrated in FIG. 4 are, as observed below, 1) the forecasted time-series has much less white-noise compared to seasonal decomposition technique, and 2) the forecasted time-series is more robust to the overfitting.

An embodiment presented is composed of multiple steps, each of which has detailed advantages as follows.

1) Principle Component Extraction: Daily Time-Series of Each Cell, of a Cellular Communication Network, is Captured by a Linear Combination of Multiple Principal Components The daily time-series pattern is captured precisely, while preventing overfitting. This is enabled by expressing the daily time-series pattern by a linear combination of multiple time-series components.

The extracted time-series pattern has much less white noise and is more robust to overfitting. The idea presented herein to suppress this white noise and overfitting is that it utilizes collected time-series KPI of all cells for cancelling out the noise.

Lower mean squared error, i.e. the components that manage to suppress the white noise reduces the mean squared error in the forecast significantly.

The components are shared over all cells, and hence, it is straightforward to evaluate the similarity in the patterns of different cells. This advantage can be further utilized for cell clustering.

2) Training Models

Embodiments presented herein are able to exploit the daily attribute (e.g. day, weather, event) when expressing the pattern of the day at a cell.

Any seasonality is not assumed (e.g. weekly repeating pattern) in the time-series data, while the existing seasonal decomposition techniques need to assume strong seasonality with a certain period.

3) Forecast

Embodiments presented herein have lower memory overhead than previous analysis.

Embodiments presented herein are able to take account the external environment and event calendars into the forecast.

Figure 5:
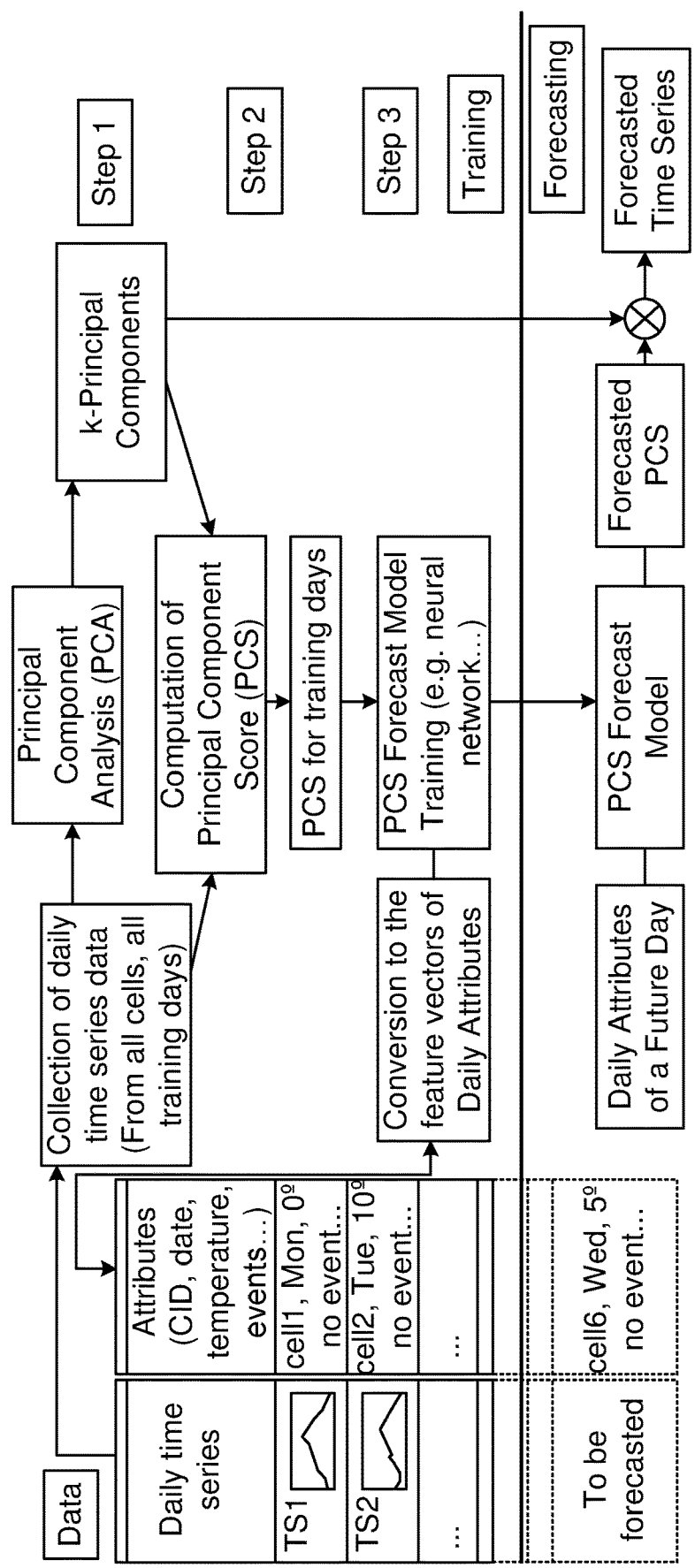
FIG. 5 is a schematic diagram illustrating a flowchart of time-series forecast.

Embodiments presented herein are split into the training phase and the forecast phase, which is illustrated in FIG. 5.

Even though a cellular communication network is used herein, the same can be applied to other kind of communication networks, including but not only wireless local area network (WLAN) and computer networks.

Training

Figure 6:
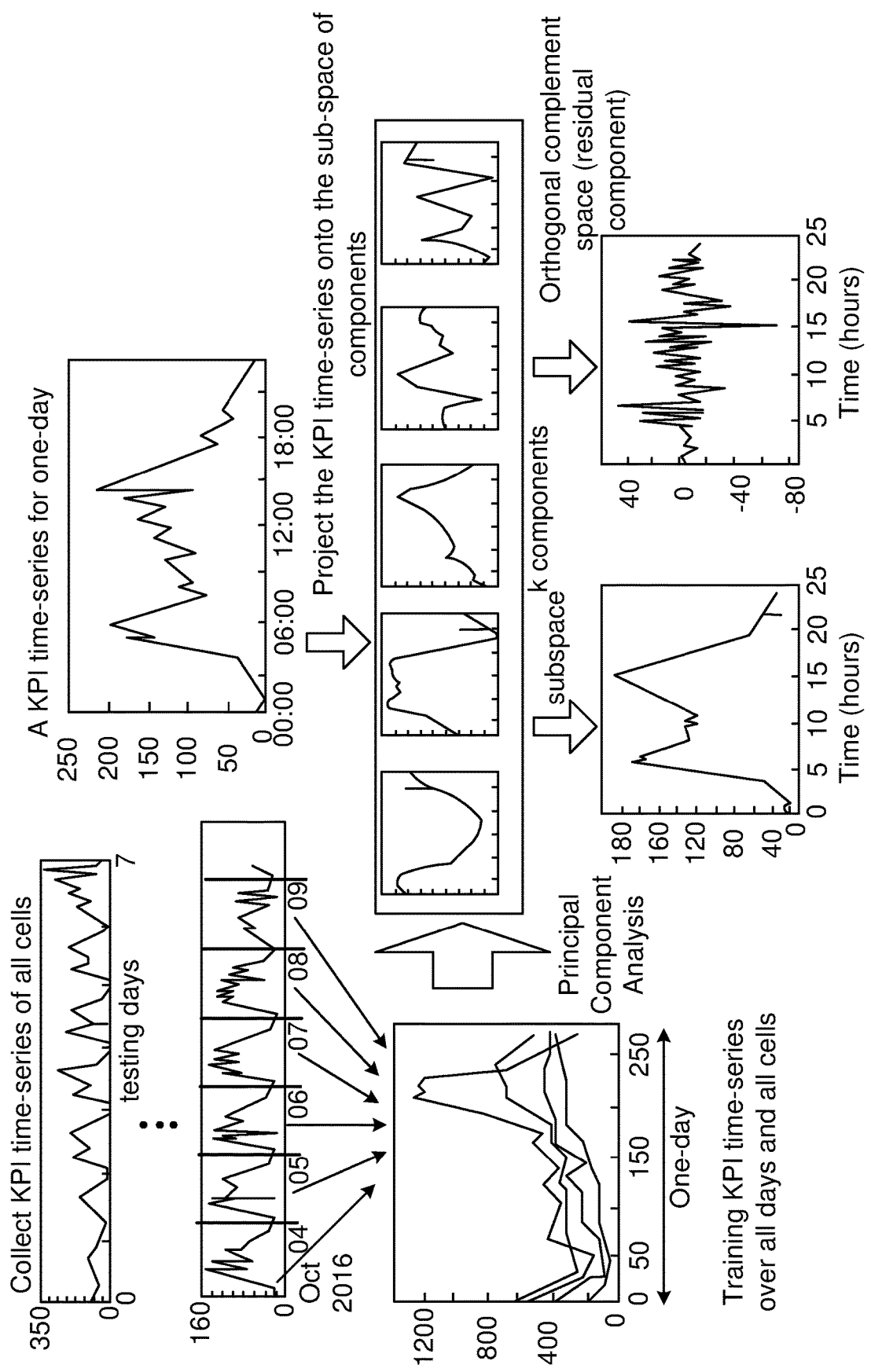
FIG. 6 is a schematic diagram illustrating an overview of k-principal components.

Step 1: Extracting k-Principal Components that are Robust to White-Noise and Overfitting, and that are Able to Express the KPI Time-Series Pattern of all Cells. This is Illustrated in FIG. 6.

The main idea in this step is that, in order to suppress white noise and over fitting in pattern-training in a cell-level aggregated KPI time-series data, the same KPI-time series data of all cells are utilized. By running a PCA algorithm on a matrix that contains all time-series data from all cells, k-components can be extracted that are able to express the time-series pattern of all cells, while successfully cancelling out the random white noise.

Matrix Build-Up for Training

A matrix A is built whose entry is a KPI value and whose dimension is the number of time slots of a day by the number of training time series. For example, if the KPI is measured every 5 minutes, and training data is collected at C number of cells for D days, the size of the training matrix is 24*60/5 by C*D.

Figure 7:
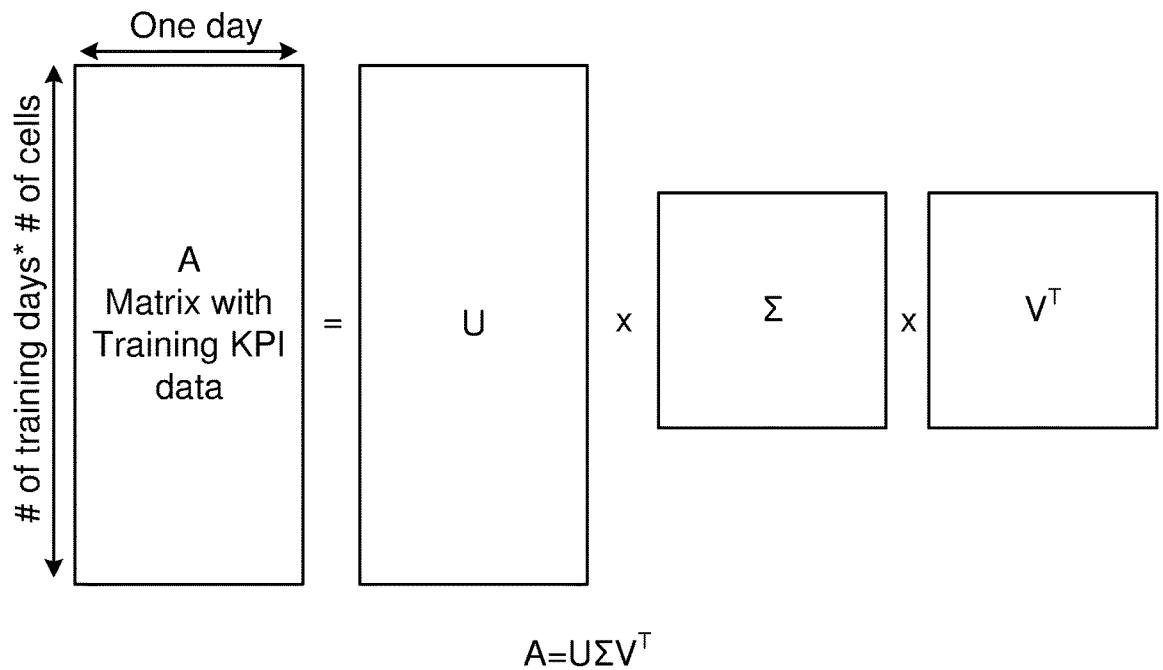
FIG. 7 is a schematic diagram illustrating singular value decomposition of an input KPI matrix.

A singular value decomposition algorithm is run on the matrix A, which is illustrated in FIG. 7.

Regard top-k singular vectors as k-principal axis: low rank approximation

The number of principal components k is a parameter that handles the overfitting and preciseness.

Figure 8:
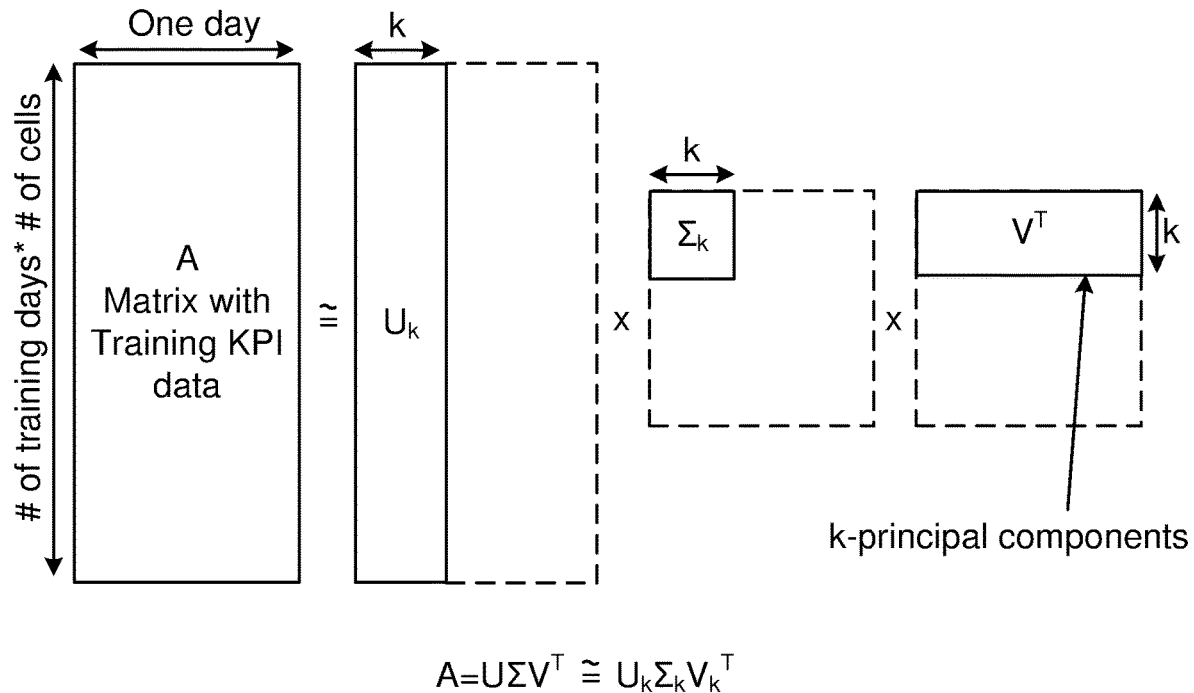
FIG. 8 is a schematic diagram illustrating low-rank approximation of input KPI matrix.

Top-k right singular vectors are collected and are made k-principal components, which is illustrated in FIG. 8. Here, the value k is a parameter for handling the trade-off between the overfitting and preciseness. One reference to decide k is to check the decreasing rate of singular values on the diagonal of the singular value matrix E.

Step 2: Computing the PCS for the Training Days

As interpretation of the one-day time-series pattern are expressed by a weighted sum of k-components, the main idea for this step is to train the pattern of the weight vectors for the forecast algorithms, rather than the time series data itself. Due to a much smaller dimension of the weight vector of the day than the time-series data of the day, the computational complexity of a forecast algorithm can be reduced significantly. The dimension of the weight vector of the day is k, which may generally be less than 10. The dimension of the time-series data of the day is the number of samples within the day, e.g. with a 5 minutes sampling the time-series for one day is 288. The dimension of the weight vector depends on the parameter k and the sampling rage, and in general k is always smaller than the number of samples within the day. In this embodiment, the weight vector of k-components are referred to as PCS.

The approach of this embodiment is that we estimate the PCS based on day-profile attributes such as date, weather, temperature, event schedule, and maintenance schedule. By demystifying the relation between PCS and the daily attribute from the training data, we can find a correct time-series pattern for the day.

Figure 9:
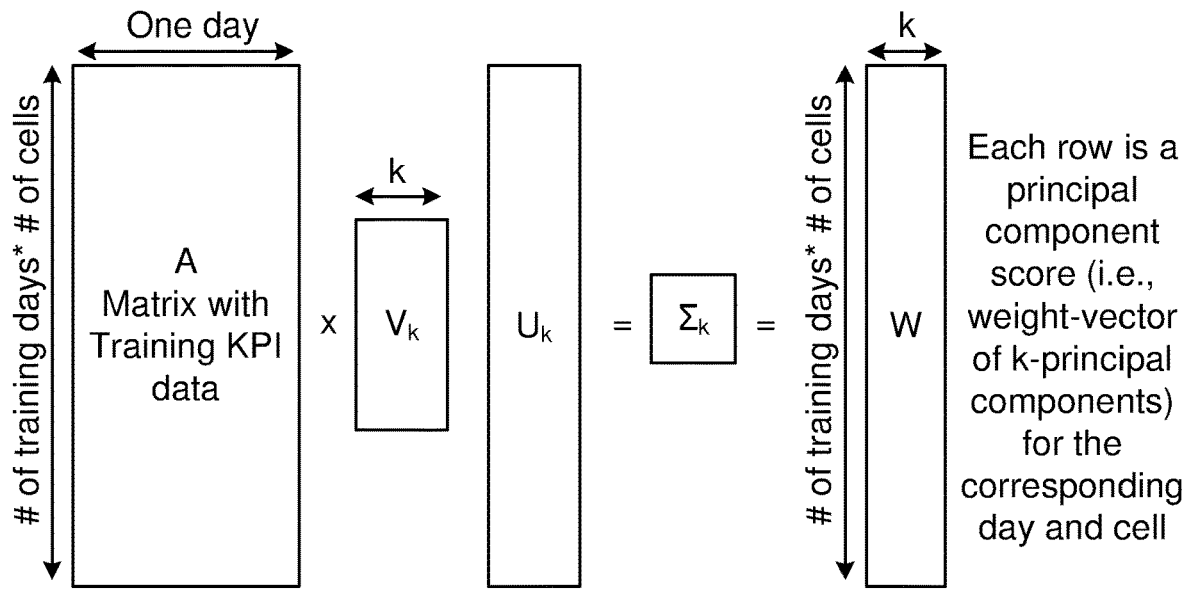
FIG. 9 is a schematic diagram illustrating PCS computation.

Projection of the training time-series of each cell onto subspace of principle components and collect the PCS for each day and cell For each cell and KPI, a training matrix $A_{cid}$ is built in which the number of rows and columns are the number of training days of a cell "cid" and time slots within a day, respectively. This is illustrated in FIG. 9, wherein $A_{cid}$ is a part of a subset of rows of training matrix A corresponding to cid. The matrix A is projected to the subspace V and PCS is obtained by the following formula.

PCS matrix for the cell "cid" is computed by
$W_{cid} = A_{cid} \times V$.

Train a PCS Forecast Model

To forecast PCS, an existing time-series forecast method (such as ARIMA) can be applied to the PCS time-series.

However, a more advanced PCS forecast technique that utilizes daily-attributes (such as day of week, temperature, etc.) may be used. In this case, the computed PCSs from training data are regarded as ground-truth result in the training.

Build Daily-Attribute

Daily attributes are built for the training day. The daily attribute composes of any information that can be collected in advance such as date, forecasted weather, forecasted temperature, scheduled events, scheduled network maintenance, etc. After that, the information is converted to a feature vector. The feature vector has discrete variables (day, weather) that are represented by categorical vectors where the corresponding entry is 1 and remaining entries are 0. A feature vector of the day of Monday is [1,0,0,0,0,0,0].

Training Only with Day-of-Week

Figure 10:
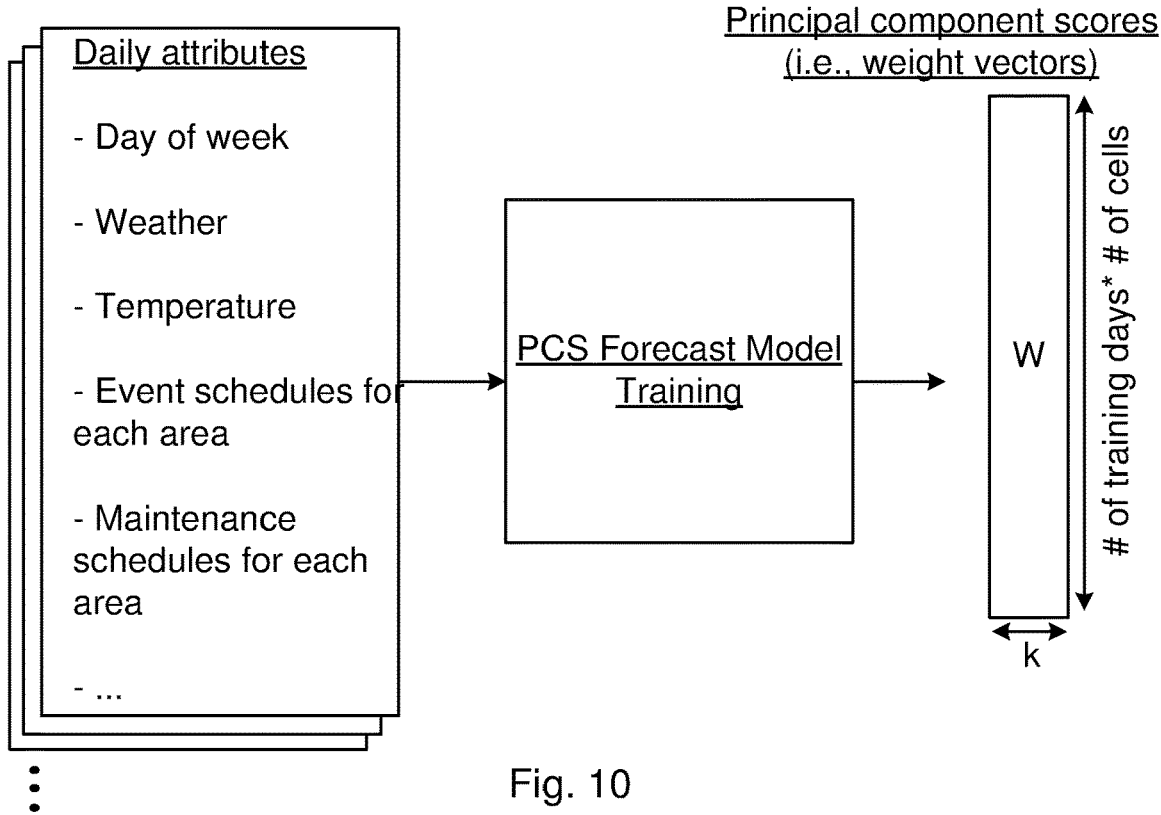
FIG. 10 is a schematic diagram illustrating PCS training with daily-attributes.

FIG. 10 illustrates PCS training with daily attributes.

A benefit by this approach compared to existing solutions that applies a ARIMA model in the time-series data is from the principle components, i.e. the forecasted time-series is robust to white-noise and overfitting, which in turn reduces the mean squared error of forecasting. This type of method is valid under the assumption in that the time-series has a regular seasonality which still makes sense in many time-series KPI data.

Deep Learning-Based Training

An alternative approach, based on deep-learning that is able to incorporate other external effects defined in a day-profile in the forecast.

The input is feature vectors of daily attribute, and the output is a PCS vector of the corresponding training days. Thus, the number of training samples is the number of training days for the cell. For training the neural network with those data, a typical back propagation algorithm is utilized.

Further alternative approaches to machine learning models may include random forest.

Forecast the Time-Series Using the Daily Attribute

Figure 11:
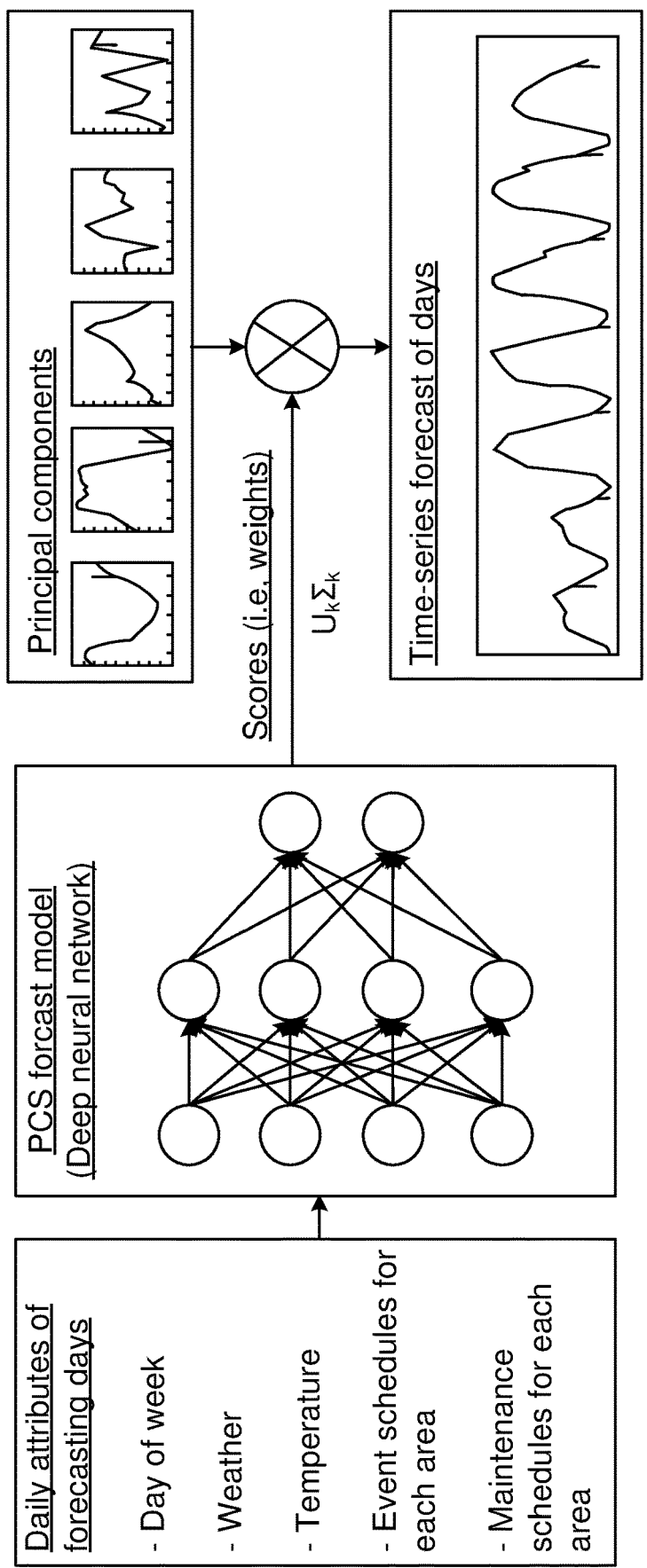
FIG. 11 is a schematic diagram illustrating time-series forecast example by incorporating deep-learning for PCS forecasting.

The day-profile is converted to the feature vector, and the PCS of the day is forecasted. Then, using the principal components and PCS, the time-series of the day is forecasted. This is illustrated in FIG. 11.

Embodiments have been presented with the example parameters (one-day, cell-level): 1) a linear combination of k-principle components (i.e. k-principle axis) express a one-day KPI time-series pattern, 2) KPI time-series are aggregated within each cell. However, the same applies also for more general parameters. For example, embodiments presented herein can handle k-principle components that expresses weekly patterns, and can be applied to KPI time-series aggregated over RNC-level or geographical region.

The presented embodiments split training of KPI time-series of all cells into one-day time-series and building a matrix including those one-day time-series of all cells. On the matrix, the presented embodiments extract k-principal components by running a PCA algorithm (i.e. k-principal axis, where k is much smaller than the number of cells) that are able to capture the KPI time-series patterns for any cell. k is a parameter dependent on use-cases, and in a test example k<10 and the number of cells are 200. A benefit from this is to make pattern-learning of one-day time-series of a single KPI more robust to overfitting and white-noise existing in training data.

The presented embodiments forecast the KPI time-series by establishing a forecasting model of PCS whose dimension is much smaller than that of time-series data. Similarly as presented above, k may be <10 and the dimension of time-series may be 288.

As the interpretation of the one-day time-series pattern are expressed by the weighted sum of k-components, the main idea in this step is to train the pattern of PCS vector (i.e. the weight vectors) for the forecast algorithms, rather than the time series data itself. Due to much smaller dimension of PCS vector than that of the time-series data, the computational complexity of forecast algorithm can be reduced significantly.

A Forecasting Model of PCS Using Daily-Attributes

One approach for training PCS forecast model is to use daily-attributes such as date, weather, temperature, event schedule, and maintenance schedule. The objective of the model is to connect the input (i.e. daily-attributes) and output (i.e. the collected PCS from training days and cells (or unit area of aggregation)).

Figures 12A, 12B:
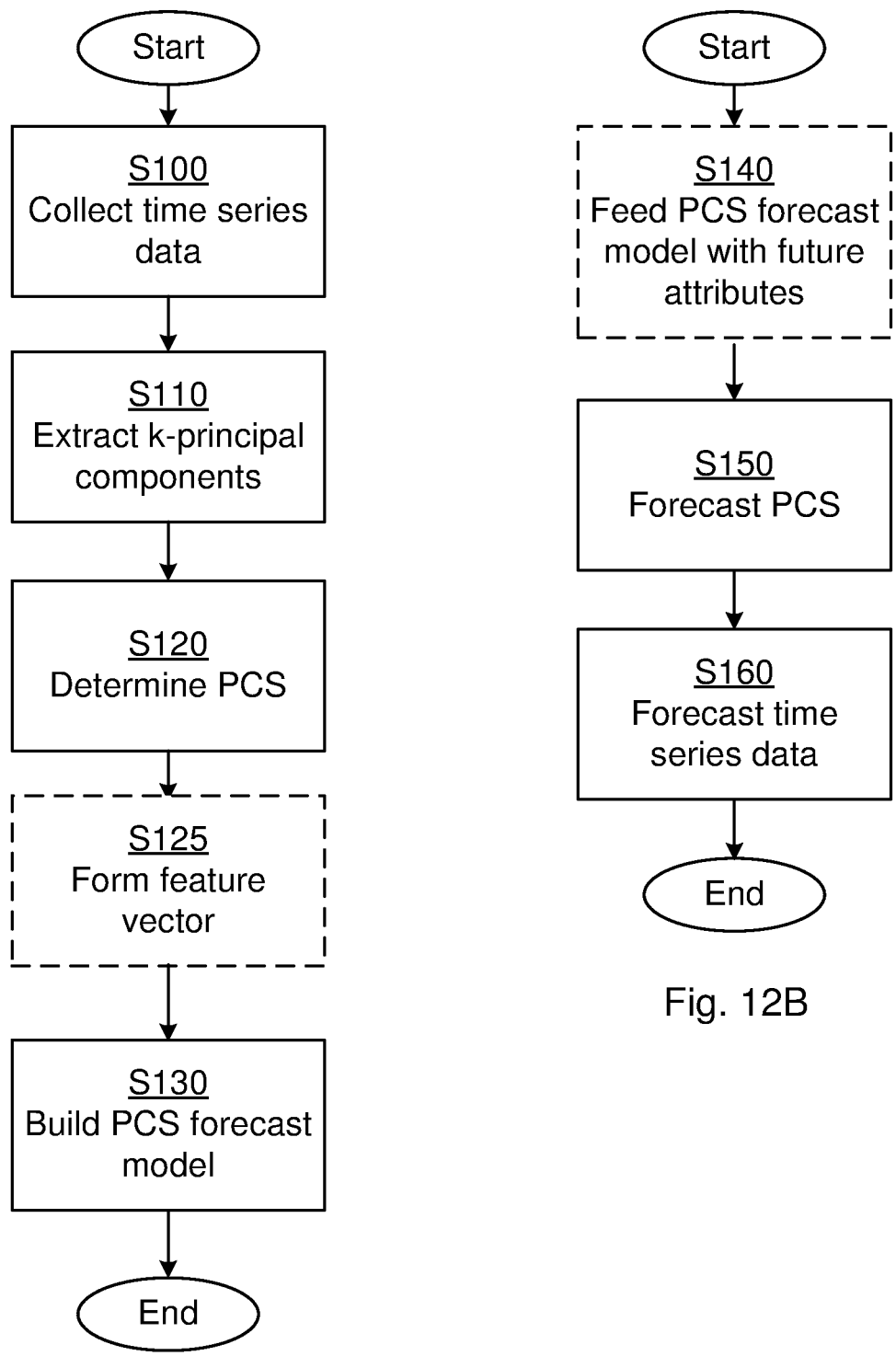
FIGS. 12A-12B are flowcharts illustrating methods for embodiments presented herein.

A method, according to an embodiment, for enabling forecasting of KPIs in a communication network is presented with reference to FIG. 12A. The method is performed by a network node and comprises collecting S100 time series data of KPIs in the communication network, extracting S110 k-principal components of the collected time series data, determining S120 a PCS from the collected time series data and the extracted k-principal components, and building S130 a PCS forecast model from the determined PCS and period of time-attributes.

The communication network may be a cellular communication network.

The collecting S100 may comprise collecting time series data for a region, the region including a plurality of cells, a geographical region of a cellular communication network or an RNC level.

The collecting S100 may comprise collecting time series data over a period of time, the period of time including daily, weekly or monthly.

The method may comprise forming S125 the period of time-attributes into a feature vector for building the PCS forecast model.

The time series data may include KPI data.

The extracting S110 may comprise forming a KPI matrix with a KPI value for number of training period of times, number of regions, and sample rate, and extracting singular k-vector thereof.

A KPI matrix may be formed with rows, each of which forms a KPI value of sampled time within the period of time, and the number of rows is equal to the number of training period of times multiplied by the number of regions, and the extracting S110 may extract the top k right singular vectors of the KPI matrix.

The period of time-attributes may include one or more of day of week, weather, temperature, and scheduled event.

The extracting S110 may comprise running a PCA.

The PCS forecast model may have a smaller dimension than that of the collected time series data.

The method may be for enabling forecasting of KPIs for network traffic.

A method, according to an embodiment, for forecasting KPIs in a communication network is presented with reference to FIG. 12B. The method is performed by a network node and comprises forecasting S150 a PCS from a PCS forecast model, wherein the PCS forecast model has been built by collected time series data of KPIs in the communication network and k-principal components extracted from the collected time series data, and forecasting S160 time series data of KPIs from the k-principle components and the forecasted PCS.

The communication network may be a cellular communication network.

The method may comprise feeding S140 future period of time-attributes into the PCS forecast model.

The forecasting S150 may be performed by an ARIMA model.

The method may be for forecasting of KPIs for network traffic.

Figure 13:
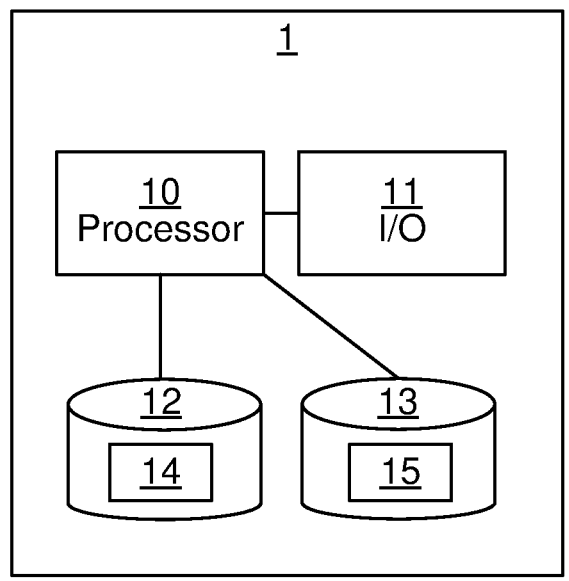
FIG. 13 is a schematic diagram illustrating some components of devices presented herein.

A network node 1, according to an embodiment, for enabling forecasting of KPIs in a communication network is presented with reference to FIG. 13. The network node comprises a processor 10, and a computer program product 12, 13. The computer program product stores instructions that, when executed by the processor, causes the network node to collect S100 time series data of KPIs in the communication network, extract S110 k-principal components of the collected time series data, determine S120 a PCS from the collected time series data and the extracted k-principal components, and to build S13o a PCS forecast model from the determined PCS and period of time-attributes.

The communication network may be a cellular communication network.

The network node may be for enabling forecasting of KPIs for network traffic.

A network node 1, according to an embodiment, for forecasting KPIs in a communication network is presented with reference to FIG. 13. The network node comprises a processor 10 and a computer program product 12, 13. The computer program product stores instructions that, when executed by the processor, causes the network node to forecast S150 a PCS from a PCS forecast model, wherein the PCS forecast model has been built by collected time series data of KPIs in the communication network and k-principal components extracted from the collected time series data, and to forecast S160 time series data of KPIs from the k-principle components and the forecasted PCS.

The communication network may be a cellular communication network.

The network node may be for forecasting of KPIs for network traffic.

Figure 14:
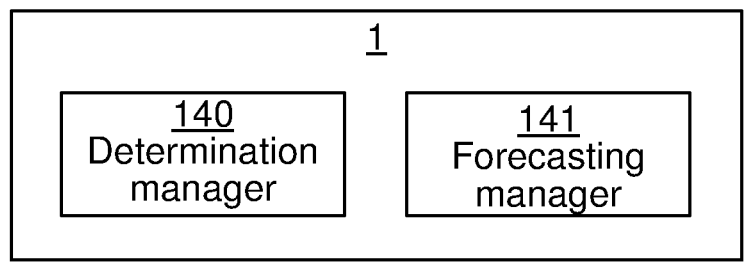
FIG. 14 is a schematic diagram showing functional modules of devices presented herein.

A network node 1, according to an embodiment, for enabling forecasting of KPIs in a communication network is presented with reference to FIG. 14. The network node comprises a determination manager 140 and a forecasting manager 141. The determination manager is for collecting S100 time series data of KPIs in the communication network, extracting S110 k-principal components of the collected time series data, and for determining S120 a PCS from the collected time series data and the extracted k-principal components. The forecasting manager is for building S130 a PCS forecast model from the determined PCS and period of time-attributes.

The communication network may be a cellular communication network.

The network node may be for enabling forecasting of KPIs for network traffic.

A network node, according to an embodiment, for forecasting KPIs in a communication network is presented with reference to FIG. 14. The network node comprises a forecasting manager 141 for forecasting S150 a PCS from a PCS forecast model, wherein the PCS forecast model has been built by collected time series data of KPIs in the communication network and k-principal components extracted from the collected time series data, and for forecasting S160 time series data of KPIs from the k-principle components and the forecasted PCS.

The communication network may be a cellular communication network.

The network node may be for forecasting of KPIs for network traffic.

A computer program 14, 15, according to an embodiment, for enabling forecasting of KPIs in a communication network is presented. The computer program comprises computer program code which, when run on a network node 1, causes the network node to collect S100 time series data of KPIs in the communication network, extract S110 k-principal components of the collected time series data, determine S120 a PCS from the collected time series data and the extracted k-principal components, and to build S130 a PCS forecast model from the determined PCS and period of time-attributes.

The communication network may be a cellular communication network.

The computer program may be for enabling forecasting of KPIs for network traffic.

A computer program 14, 15, according to an embodiment, for forecasting KPIs in a communication network is presented. The computer program comprises computer program code which, when run on a network node, causes the network node to forecast S150 a PCS from a PCS forecast model, wherein the PCS forecast model has been built by collected time series data of KPIs in the communication network and k-principal components extracted from the collected time series data, and to forecast S160 time series data of KPIs from the k-principle components and the forecasted PCS.

The communication network may be a cellular communication network.

The computer program may be for forecasting of KPIs for network traffic.

A computer program product 12, 13 comprising a computer program 14, 15 and a computer readable storage means on which the computer program 14, 15 is stored is also presented.

FIG. 13 is a schematic diagram showing some components of the network node 1. The processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIGS. 12A and 12B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the network node 1.

The network node 1 may further comprise an input/output (I/O) interface ii including e.g. a user interface. The network node 1 may further comprise a receiver configured to receive signalling from other nodes, and a transmitter configured to transmit signalling to other nodes (not illustrated). Other components of the network node 1 are omitted in order not to obscure the concepts presented herein.

FIG. 14 is a schematic diagram showing functional blocks of the network node 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 12A and 12B, comprising a determination manager unit 140 and a forecasting manager unit 141. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 140 is for enabling forecasting of KPIs in a communication network. This module corresponds to the collect step S100, the extract step S110, and the determine step S120 of FIG. 12A. This module can e.g. be implemented by the processor 10 of FIG. 7, when running the computer program.

The forecasting manger 141 is for forecasting of KPIs in a communication network. This module corresponds to the build step S130 of FIG. 12A, the feed step S140, the forecast step S150, and the forecast step S160 of FIG. 12B. This module can e.g. be implemented by the processor 10 of FIG. 13, when running the computer program.

The solution has mainly been described above with reference to a few embodiments. However, as is readily appreciated by a person skilled in the art, other embodiments than the ones disclosed above are equally possible, as defined by the appended enumerated list of embodiments.

The following are certain enumerated embodiments further illustrating various aspects the disclosed subject matter.

1. A method for enabling forecasting of key performance indicators (KPIs) in a communication network, the method being performed by a network node and comprising:
collecting (S100) time series data of KPIs in the communication network;
extracting (S110) k-principal components of the collected time series data;
determining (S120) a principal component score (PCS) from the collected time series data and the extracted k-principal components; and
building (S130) a PCS forecast model from the determined PCS and period of time-attributes.

2. The method according to item 1, wherein the collecting (S100) comprises collecting time series data for a region, the region including a plurality of cells, a geographical region of a cellular communication network or a radio network controller (RNC) level.

3. The method according to item 1 or 2, wherein the collecting (S100) comprises collecting time series data over a period of time, the period of time including daily, weekly or monthly.

4. The method according to any one of items 1 to 3, comprising: forming (S125) the period of time-attributes into a feature vector for building the PCS forecast model.

5. The method according to any one of items 1 to 4, wherein the extracting (S110) comprises forming a KPI matrix with a KPI value for number of training period of times, number of regions, and sample rate, and extracting singular k-vector thereof.

6. The method according to any one of items 1 to 4, wherein a KPI matrix is formed with rows, each of which forms a KPI value of sampled time within the period of time, and the number of rows is equal to the number of training period of times times the number of regions, and the extracting (S110) extracts the top k right singular vectors of the KPI matrix.

7. The method according to any one of items 1 to 6, wherein the period of time-attributes includes one or more of day of week, weather, temperature, and scheduled event.

8. The method according to any one of items 1 to 7, wherein the extracting (S110) comprises running a principal component analysis (PCA).

9. The method according to any one of items 1 to 8, wherein the PCS forecast model has a smaller dimension than that of the collected time series data.

10. The method according to any one of items 1 to 9, wherein the communication network is a cellular communication network.

11. The method according to any one of items 1 to 9, wherein the method is for enabling forecasting of KPIs for network traffic.

12. A method for forecasting key performance indicators (KPIs) in a communication network, the method being performed by a network node and comprising:
forecasting (S150) a principal component score (PCS) from a PCS forecast model, wherein the PCS forecast model has been built by collected time series data of KPIs in the communication network and k-principal components extracted from the collected time series data; and forecasting (S160) time series data of KPIs from the k-principle components and the forecasted PCS.

13. The method according to item 12, comprising:
feeding (S140) future period of time-attributes into the PCS forecast model.

14. The method according to item 13, wherein the future period of time-attributes includes one or more of day of week, forecasted weather, forecasted temperature, and scheduled event.

15. The method according to item 12, wherein the forecasting (S150) is performed by an autoregressive integrated moving average (ARIMA) model.

16. The method according to any one of items 12 to 15, wherein the communication network is a cellular communication network.

17. The method according to any one of items 12 to 16, wherein the method is for forecasting of KPIs for network traffic.

18. A network node for enabling forecasting of key performance indicators (KPIs) in a communication network, the network node comprising:
a processor (10); and
a computer program product (12, 13) storing instructions that, when executed by the processor, causes the network node to:
collect (S100) time series data of KPIs in the communication network;
extract (S110) k-principal components of the collected time series data;
determine (S120) a principal component score (PCS) from the collected time series data and the extracted k-principal components; and
build (S130) a PCS forecast model from the determined PCS and period of time-attributes.

19. The network node according to item 18, wherein the collect (S100) comprises collect time series data for a region, the region including a plurality of cells, a geographical region of a cellular communication network or a radio network controller (RNC) level.

20. The network node according to item 18 or 19, wherein the collect (S100) comprises collect time series data over a period of time, the period of time including daily, weekly or monthly.

21. The network node according to any one of items 18 to 20, caused to:
form (S125) the period of time-attributes into a feature vector for building the PCS forecast model.

22. The network node according to any one of items 18 to 21, wherein the extract (S110) comprises form a KPI matrix with a KPI value for number of training period of times, number of regions, and sample rate, and extracting singular k-vector thereof.

23. The network node according to any one of items 18 to 21, wherein a KPI matrix is formed with rows, each of which forms a KPI value of sampled time within the period of time, and the number of rows is equal to the number of training period of times times the number of regions, and the extract (S110) extracts the top k right singular vectors of the KPI matrix.

24. The network node according to any one of items 18 to 23, wherein the period of time-attributes includes one or more of day of week, weather, temperature, and scheduled event.

25. The network node according to any one of items 18 to 24, wherein the extract (S110) comprises running a principal component analysis (PCA).

26. The network node according to any one of items 18 to 25, wherein the PCS forecast model has a smaller dimension than that of the collected time series data.

27. The network node according to any one of items 18 to 26, wherein the network node is for enabling forecasting of KPIs for network traffic.

28. A network node for forecasting key performance indicators (KPIs) in a communication network, the network node comprising:
a processor (10); and
a computer program product (12, 13) storing instructions that, when executed by the processor, causes the network node to:
forecast (S150) a principal component score (PCS) from a PCS forecast model, wherein the PCS forecast model has been built by collected time series data of KPIs in the communication network and k-principal components extracted from the collected time series data; and
forecast (S160) time series data of KPIs from the k-principle components and the forecasted PCS.

29. The network node according to item 28, caused to:
feed (S140) future period of time-attributes into the PCS forecast model.

30. The network node according to item 29, wherein the future period of time-attributes includes one or more of day of week, forecasted weather, forecasted temperature, and scheduled event.

31. The network node according to item 28, wherein the forecast (S150) is performed by an autoregressive integrated moving average (ARIMA) model.

32. The network node according to any one of items 28 to 31, wherein the network node is for forecasting of KPIs for network traffic.

33. A network node for enabling forecasting of key performance indicators (KPIs) in a communication network, the network node comprising:
a determination manager (140) for collecting (S100) time series data of KPIs in the communication network, extracting (S110) k-principal components of the collected time series data, and determining (S120) a principal component score (PCS) from the collected time series data and the extracted k-principal components; and
a forecasting manager (141) for building (S130) a PCS forecast model from the determined PCS and period of time-attributes.

34. A network node for forecasting key performance indicators (KPIs) in a communication network, the network node comprising:
a forecasting manager (141) for forecasting (S150) a principal component score (PCS) from a PCS forecast model, wherein the PCS forecast model has been built by collected time series data of KPIs in the communication network and k-principal components extracted from the collected time series data, and forecasting (S160) time series data of KPIs from the k-principle components and the forecasted PCS.

35. A computer program (14, 15) for enabling forecasting of key performance indicators (KPIs) in a communication network, the computer program comprising computer program code which, when run on a network node, causes the network node to:
collect (S100) time series data of KPIs in the communication network;
extract (S110) k-principal components of the collected time series data;
determine (S120) a principal component score (PCS) from the collected time series data and the extracted k-principal components; and
build (S130) a PCS forecast model from the determined PCS and period of time-attributes.

36. A computer program (14, 15) for forecasting key performance indicators (KPIs) in a communication network, the computer program comprising computer program code which, when run on a network node, causes the network node to:
forecast (S150) a principal component score (PCS) from a PCS forecast model, wherein the PCS forecast model has been built by collected time series data of KPIs in the communication network and k-principal components extracted from the collected time series data; and
forecast (S160) time series data of KPIs from the k-principle components and the forecasted PCS.

37. A computer program product (12, 13) comprising a computer program (14, 15) according to item 35 or 36 and a computer readable storage means on which the computer program (14, 15) is stored.

The invention claimed is:

1. A method for enabling forecasting of key performance indicators (KPIs) in a communication network, the method being performed by a network node and comprising:
collecting time series data of KPIs in the communication network;
extracting k-principal components of the collected time series data;
determining a principal component score (PCS) from the collected time series data and the extracted k-principal components; and
building a PCS forecast model from the determined PCS and one or more period of time-attributes, wherein extracting the k-principal components comprises:
forming a KPI matrix;
performing a singular value decomposition of the KPI matrix to produce a matrix comprising right-singular vectors of the KPI matrix; and
extracting the top k right-singular vectors of the KPI matrix, wherein the k-principal components are the top k right-singular vectors.

2. A network node for enabling forecasting of key performance indicators (KPIs) in a communication network, the network node comprising:
a processor; and
a computer program product storing instructions that, when executed by the processor, causes the network node to:
collect time series data of KPIs in the communication network;
extract k-principal components of the collected time series data;
determine a principal component score (PCS) from the collected time series data and the extracted k-principal components; and
build a PCS forecast model from the determined PCS and one or more period of time-attributes, wherein
the network node is configured to extract the k-principal components by performing a process that comprises:
forming a KPI matrix;
performing a singular value decomposition of the KPI matrix to produce a matrix comprising right-singular vectors of the KPI matrix; and
extracting the top k right-singular vectors of the KPI matrix, wherein the k-principal components are the top k right-singular vectors.

3. The network node of claim 2, wherein the network node is configured to collect the time series data by performing a process that includes collecting time series data for a region, the region including a plurality of cells, a geographical region of a cellular communication network or a radio network controller, RNC, level.

4. The network node of claim 2, wherein the network node is configured to collect the time series data by performing a process that includes collecting time series data over a period of time, the period of time including daily, weekly or monthly.

5. The network node of claim 2, wherein the network node is configured to form the one or more period of time-attributes into a feature vector for building the PCS forecast model.

6. The network node of claim 2, wherein the KPI matrix is a matrix with a KPI value for number of training period of times, number of regions, and sample rate.

7. The network node of claim 2, wherein the KPI matrix is formed with rows, each of which forms a KPI value of sampled time within the period of time, and the number of rows is equal to the number of training period of times multiplied by the number of regions.

8. The network node of claim 2, wherein the one or more period of time-attributes includes one or more of day of week, weather, temperature, and scheduled event.

9. The network node of claim 2, wherein the network node is configured to extract the k-principal components of the collected time series data by performing a process that includes running a principal component analysis.

10. The network node of claim 2, wherein the PCS forecast model has a smaller dimension than that of the collected time series data.

11. The network node of claim 2, wherein the network node is for enabling forecasting of KPIs for network traffic.

12. A network node for enabling forecasting of key performance indicators (KPIs) in a communication network, the network node comprising:

a determination manager for collecting time series data of KPIs in the communication network, extracting k-principal components of the collected time series data by performing a process that comprises: forming a KPI matrix; performing a singular value decomposition of the KPI matrix to produce a matrix comprising right-singular vectors of the KPI matrix; and extracting the top k right-singular vectors of the KPI matrix, wherein the k-principal components are the top k right-singular vectors, and determining a principal component score (PCS) from the collected time series data and the extracted k-principal components; and a forecasting manager for building a PCS forecast model from the determined PCS and one or more period of time-attributes.

13. A non-transitory computer readable medium storing a computer program for enabling forecasting of key performance indicators (KPIs) in a communication network, the computer program comprising computer program code which, when run on a network node, causes the network node to:

collect time series data of KPIs in the communication network;

extract k-principal components of the collected time series data by performing a process that comprises: forming a KPI matrix; performing a singular value decomposition of the KPI matrix to produce a matrix comprising right-singular vectors of the KPI matrix; and extracting the top k right-singular vectors of the KPI matrix, wherein the k-principal components are the top k right-singular vectors;

determine a principal component score (PCS) from the collected time series data and the extracted k-principal components; and build a PCS forecast model from the determined PCS and one or more period of time-attributes.

\* \* \* \* \*